United States Patent
Johnson

[11] Patent Number: 6,044,914
[45] Date of Patent: Apr. 4, 2000

[54] GARDEN TOOL WITH BACK STRAIN RELIEF FEATURE

[76] Inventor: Gerald R. Johnson, 1909 Traffic Way, Atascadero, Calif. 93422

[21] Appl. No.: 08/991,871

[22] Filed: Dec. 16, 1997

[51] Int. Cl.⁷ ...................................................... A01B 1/00
[52] U.S. Cl. ........................... 172/377; 172/380; 294/55; 30/314
[58] Field of Search .................... 172/371, 372, 172/377, 380; 294/49, 50, 50.5, 51, 53.5, 55, 56, 57, 58, 59; 30/314

[56] References Cited

U.S. PATENT DOCUMENTS

| | | | |
|---|---|---|---|
| 272,087 | 2/1883 | Rothman | 172/372 |
| 343,606 | 6/1886 | Pitney et al. | 172/372 |
| 390,783 | 10/1888 | Hooker | 172/372 |
| 669,163 | 3/1901 | Grover | 172/372 |
| 677,150 | 6/1901 | Zimmerman | 172/377 |
| 1,070,766 | 8/1913 | Braun | 30/314 |
| 1,334,586 | 3/1920 | Baker | 30/314 X |
| 1,739,489 | 12/1929 | Wagner | 30/314 X |
| 1,946,006 | 2/1934 | Struckmeyer | 30/314 X |
| 2,228,275 | 1/1941 | Lawrence | 294/57 |
| 2,264,636 | 12/1941 | Griswold et al. | 172/371 |
| 2,291,144 | 7/1942 | Brownsey | 172/372 |
| 3,065,801 | 11/1962 | Wood | 172/377 |
| 3,176,780 | 4/1965 | Sommer | 172/377 |
| 3,226,149 | 12/1965 | McJohnson | 294/50 |
| 3,604,518 | 9/1971 | Buchanan | 172/372 |
| 3,782,770 | 1/1974 | Lee | 294/49 |
| 3,942,591 | 3/1976 | Brannin | 30/314 X |
| 3,952,812 | 4/1976 | Lucan | 172/375 |
| 4,334,583 | 6/1982 | Parker | 172/375 |
| 4,377,211 | 3/1983 | Voss | 172/375 |
| 4,546,831 | 10/1985 | Albertson | 172/13 |
| 4,779,685 | 10/1988 | Combs | 172/380 |
| 4,790,585 | 12/1988 | Vernon et al. | 294/51 |
| 4,865,372 | 9/1989 | Gabriel | 294/49 |
| 5,060,997 | 10/1991 | Plecki | 294/50.6 |
| 5,188,340 | 2/1993 | Green | 254/132 |
| 5,244,241 | 9/1993 | Lee | 284/50.6 |
| 5,257,666 | 11/1993 | Townsend, Jr. | 172/378 |
| 5,390,746 | 2/1995 | Page | 172/371 |
| 5,479,993 | 1/1996 | Bojar | 172/372 |
| 5,791,707 | 8/1998 | Szakurski | 294/54.5 |
| 5,791,708 | 8/1998 | Capriotti | 172/377 X |
| 5,810,408 | 9/1998 | Armstrong | 294/57 |

FOREIGN PATENT DOCUMENTS

| | | | |
|---|---|---|---|
| 484399 | 10/1929 | Germany | 172/371 |

*Primary Examiner*—Victor Batson
*Attorney, Agent, or Firm*—Mitchell, Silberberg & Knupp LLP

[57] ABSTRACT

The present invention discloses an apparatus for removing unwanted plants from a specific area of soil. The invention is comprised of a blade that is adapted to penetrate the surface of the soil and moving substantially parallel to the surface thereof. Proper movement of the blade is assisted by fins positioned on the sides of the blade, and act similarly to the rudder of a boat. The blade has a support member that has one end attached to the blade and the other end is capable of receiving a handle. The handle is configured in an arcuate shape to better facilitate grasping and holding by the user. This combination allows the user to grasp the handle, one hand on each side of the support member and blade, and push the invention forward undercutting the undesirable plant roots, thereby killing them. Minimal disruption of the soil is experienced, thereby optimizing the efficiency of work done by the user.

4 Claims, 5 Drawing Sheets

GARDEN TOOL WITH BACK STRAIN RELIEF FEATURE

BACKGROUND OF THE INVENTION

1. Field of the Invention

The invention herein relates to a hand held garden tool and more specifically to a class of garden tool that is intended to assist in removing unwanted plants.

2. Overview of Prior Art

Since the beginning of time, mankind has been plagued with the competition of unwanted plants in relation to desirable plants with regard to water, nutrients and sunlight. As such, long ago tools were created to assist in the task of removing the unwanted plants to aid in the growth of the desirable plants. In the most basic form, the desirable plants produce food for the person who tilled the soil, aiding in their survival, but also ornamental displays such as lawns, playing fields and flower gardens benefit from agron cultivation.

Various attempts in the form of tools have been made to assist in this process of tilling the soil. The most traditional includes a hoe. This tool includes a blade that is capable of striking the soil and penetrating its surface, cutting the roots of the unwanted plants and allowing the soil to be "turned over" onto the plants, suggesting their demise. Two problems exist. First, the physical work required to move the mass of the soil accompanied with the work of "chiseling" the soil loose is excessive and unnecessary. This results in great energy expenditure by the user, resulting in minimal time at task before becoming physically tired and forced to stop.

The second problem is when the hoe is brought down slicing the ground in a substantially vertical orientation, many of the roots of the plants may be left undamaged, and left to grow back. The result is extra work to do a less than adequate job. Much of the prior art reflects this level of function or more accurately the lack of function. The first of which is disclosed by Lucan in U.S. Pat. No. 3,952,812. Here a traditional blade of a hoe is accompanied by a tool intended to pull weeds.

In a similar fashion, Voss disclosed in U.S. Pat. No. 4,377,211 a hoe with a curved blade and a hooked cutting edge. The limitations are previously disclosed are apparent here as well.

A curb weeder is disclosed by Albertson in U.S. Pat. No. 4,546,831 in which the functions and limitations of the previously disclosed are consistent with the exception that the blade of this device is of a minimal size and cupped for use on small areas such as the cracks of sidewalks and therefore not functional in an open area as a hoe would typically be used.

Another device that was disclosed was by Parker in U.S. Pat. No. 4,334,583. Here a shovel like device is disclosed that is intended to perform many functions pertaining to yard work. The blade is substantially flat to the longitudinal handle and therefore this makes the device function more as a shovel than a hoe with regard to tilling the soil, but the limitations as discussed still apply in that soil would typically be uprooted and turned after every digging stroke.

A trenching tool was disclosed by Lee in U.S. Pat. No. 3,782,770 in which a narrow shovel head is used where the angle between the shovel head base and the longitudinal handle is less than 180 degrees. This device includes a shovel head that is intended to scoop and hold soil thereon. Such a device would be of minimal value as a weeding device for the reasons already disclosed. In addition, the handle of this and all of the formerly disclosed are longitudinal in form. This works fine for carrying an item, but to apply a pushing force to a handle of this design, as would be desirable in a weeding tool, would be very inefficient.

The handle issue was addressed by Gabriel in U.S. Pat. No. 4,865,372 in which a shovel-like apparatus was disclosed including bicycle-like handle bars that are attached to a longitudinal member which is in turn mounted to a type of shovel head. Handle bars of this type are useful when pushing the shovel head such as when shoveling snow or other material that can be "dozed" and lifted. Here both hands can be placed side by side, allowing for an effective transfer of force from the user to the device with minimal twist on the user's spine. The twist is what puts the user's spine in a precarious position by being susceptible to injury from applied force. Though the disclosed device does address this issue it is not suitable for slicing under soil due to the size, weight and complexity of the shovel head.

Disclosures that are directed to slicing under the soil to kill unwanted plants are very limited. One device was disclosed by Buchanan in U.S. Pat. No. 3,604,518. Here a triangular base is fastened to a longitudinal handle by two vertical risers attached to the triangular base. The device is pulled or pushed just below the surface of the ground to destroy the roots of the unwanted plants. Problems include guiding or steering the device and the inefficient method of power transmittal by use of a longitudinal handle as previously supported.

The disclosure by Page in U.S. Pat. No. 5,390,746 shows a longitudinal support with a handle on one end and a flat blade on the other end. As previously, the blade is adapted to penetrate the surface of the soil and destroy the root system of the unwanted plants with minimal energy expenditure by the user. The handle is simply a longitudinal rod positioned substantially parallel to the blade. A grip is included on the longitudinal support to assist in grasping the longitudinal portion with one of the user's hands, while the other is on the handle.

The device is an improvement over much of the art in regard to the task of weeding, but guiding or steering the blade would still be difficult at best especially in soil that includes a fair amount of weed roots, but the biggest problem is stress on the user's back. Because of the position of the user's hands on the device, the user's body must be rotated when applying force in a forward manner. This results in a torsional load on the user's spine and reduces the ability to apply force to the device to do work.

In the realm of hand held weeding tools, numerous disclosures exist that are intended to remove a single weed and its root system at a time. Such disclosures include Lee, Green, Plecki and Hostetter in U. S. Pat. Nos. 5,244,241; 5,188,340; 5,060,997 and 4,456,075 respectively. Each if these devices includes a substantially linear shank each with some type of hook or blade structure mounted thereto. The devices vertically penetrate the soil next to a plant and allow for rotation to secure the root of the plant so that the user can then extract the plant and root from the soil. Such devices are not functional on large areas because of the time requirement to extract each plant, one at a time, and they are only of value on larger plants, typically broadleaf type plants, and not effective on grasses.

Finally, a type of lever devices for removing plants were disclosed by Combs, Townsend, Jr. and Vernon, et al. in U.S. Pat. Nos. 4,779,685; 5,257,666 and 4,790,585 respectively. Here the common denominator includes a longitudinal lever in the form of a handle with one end adapted to penetrate the soil. The benefit to such a category of weed pullers is that, in many cases, great forces can be transferred by the user to extract a plant. The inadequacy is that it is slow, again because of the limitation of displacing only one plant at a time. In many cases a large area needs to be worked and small grasses and weeds are the biggest concern. The large plants can be extracted one at time by hand if necessary, because there are usually few of them, otherwise motor powered implementation is relied upon.

SUMMARY OF THE INVENTION

The object of the disclosed invention is to provide a means of destroying unwanted plants from an area of soil. The invention is comprised of a blade that is adapted to penetrate the surface of the soil, moving substantially parallel to the surface of the ground. Movement of the blade is assisted by fins positioned on the sides of the blade, acting similar to the rudder of a boat. The blade has a support member that has one end attached to the blade and the other end being capable of receiving a handle.

The handle is configured in an arcuate or curved shape similar to a portion of a steering wheel on an automobile. This allows the user to grasp the handle, one hand on each side of the support member and therefore also the blade, and push the combination forward undercutting the undesirable plant roots, thereby killing them. Minimal disruption of the soil is experienced, thereby wasted energy in performing this task is greatly diminished.

In the preferred embodiment, the handle is adjustable in height. This modification further allows the user to apply a great deal of force to the blade without twisting or contorting the user's body. This biomechanical positioning of the user allows for greater force production while minimizing stress on the user's lower back.

DETAILED DESCRIPTION OF THE INVENTION

Mankind has always been plagued with an agricultural war. The battle against unwanted plants is the greatest fight, in that other plants compete with desired plants for necessary nutrients in the soil, water and sunlight. Reducing the competition stacks the deck in favor of the desired plants flourishing. This means greater yield for food producing plants and more spectacular flowers and other ornamental plants. The generic term for this task is referred to as "weeding" which consists of removing the unwanted weeds. Mankind's ability to develop tools to make jobs more efficient has not eluded the process of weeding, but advancements in this area have been slow coming at best. Very primitive tools that have been used for hundreds, if not thousands of years. Case and point is the common garden hoe. This device has remained virtually unchanged in function and design for decades.

In the modern day, powered tillers eliminate the need for mechanical efficiency, but some jobs still necessitate work by hand. Expense, accessibility to larger equipment and sometimes the delicate nature of the job demands picking up a tool. When this is the case, efficiency of the tool is of utmost importance. The invention disclosed herein maximizes the efficiency of such a task.

Figure 1:
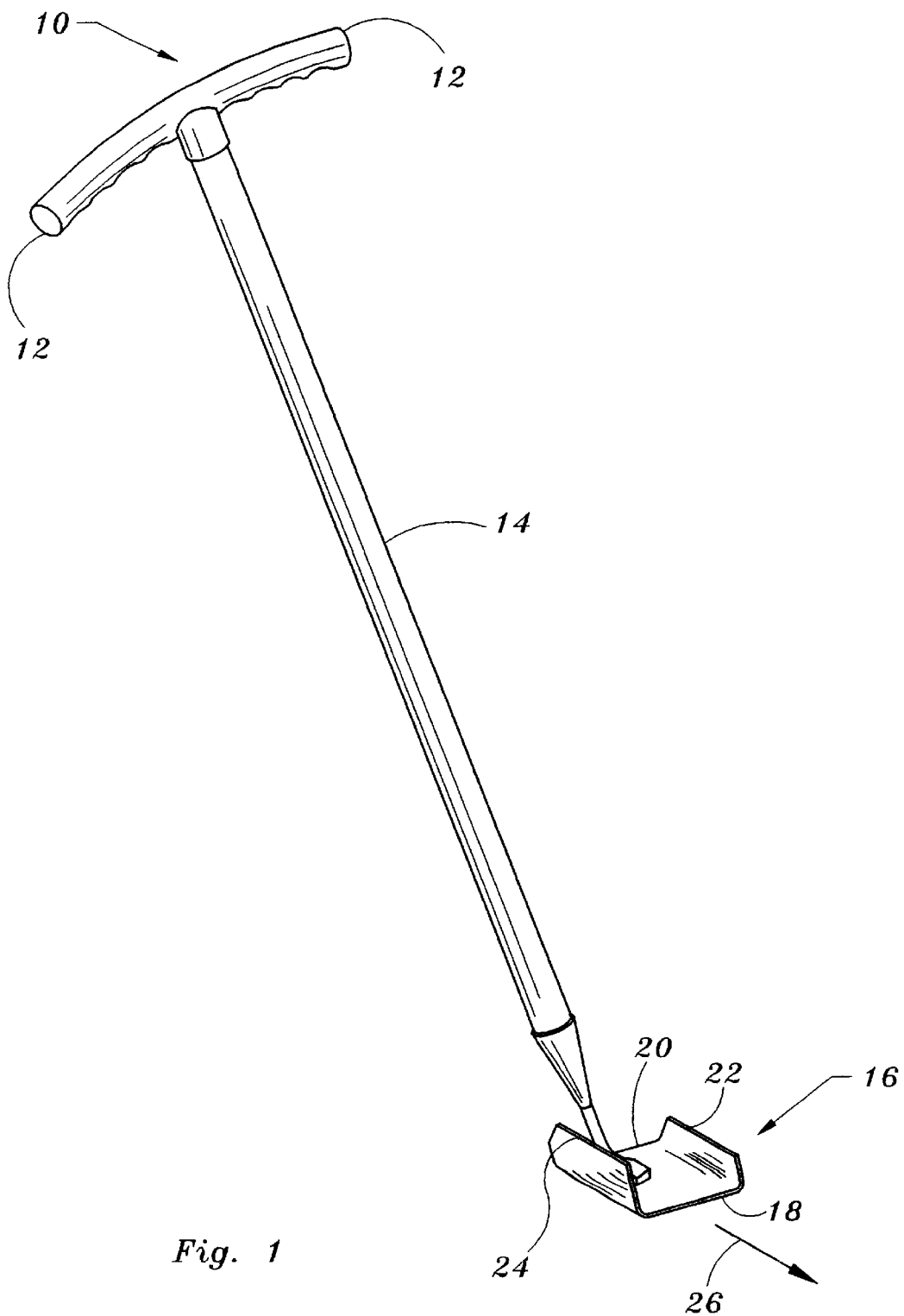
FIG. 1 is an isometric view of a garden tool produced in accordance with the present invention.

Referring to the drawings, FIG. 1 shows an isometric view of a garden tool including a handle 10. This handle 10 has a curved or arcuate shape to allow the user's wrists to be slightly pronated from neutral, thereby reducing fatigue when the user applies force thereto as is done in normal of the invention by pushing and pulling on the handle 10. Near the open ends of the curve are hand grips 12, thus facilitating grasping by the user. An elongated support member 14 has one end secured to the handle 10 and the other end secured to a blade 16. The blade is a critical part of the invention in that it functions to cut through the ground in a movement just below and parallel to its surface, slicing through the roots of the weeds. This kills the weeds by removing their food supply and does so with minimal energy expenditure by the user while allowing minimal moisture loss to the soil. The blade 16 is adapted to accomplish this task by structures including an open front edge 18 and open rear edge 20. This allows the soil to pass from the front edge 18 to the rear edge 20 with minimal resistance. To stabilize the blade 16 when moving under the surface of the soil, a left fin 22 and a right fin 24 are included, positioned parallel to each other. These fins act as rudders, stabilizing the blade as it slices through the earth.

The invention is used by grasping the grips 12 at the handle 10 with the user's body positioned there between. The user then pushes forward, causing the front edge 18 of the blade 16 to penetrate the surface of the soil. The soil passing between the left fin 22 and the right fin 24 and then freely passing past the rear edge 20. This process necessitates the severing of any vertical roots of plants growing in the soil where the blade 16 passed.

The front edge 18 of the blade 16 is adapted to cut and would usually include a sharpened extreme edge and may also be angled with respect to the direction of movement as depicted by the arrow 26. This angle assists in slicing through the soil as a knife would while maintaining linear movement of the blade is ensured by the fins (22 and 24). Since the process does not lift or turn the soil or plants, the physical work done by the user to accomplish the needed task is minimized, thus optimizing the user's efficiency. In addition, since the soil is not turned over, the moisture under the surface of the soil is not exposed to the sun, thus not removing critical moisture from the ground.

Figure 2:
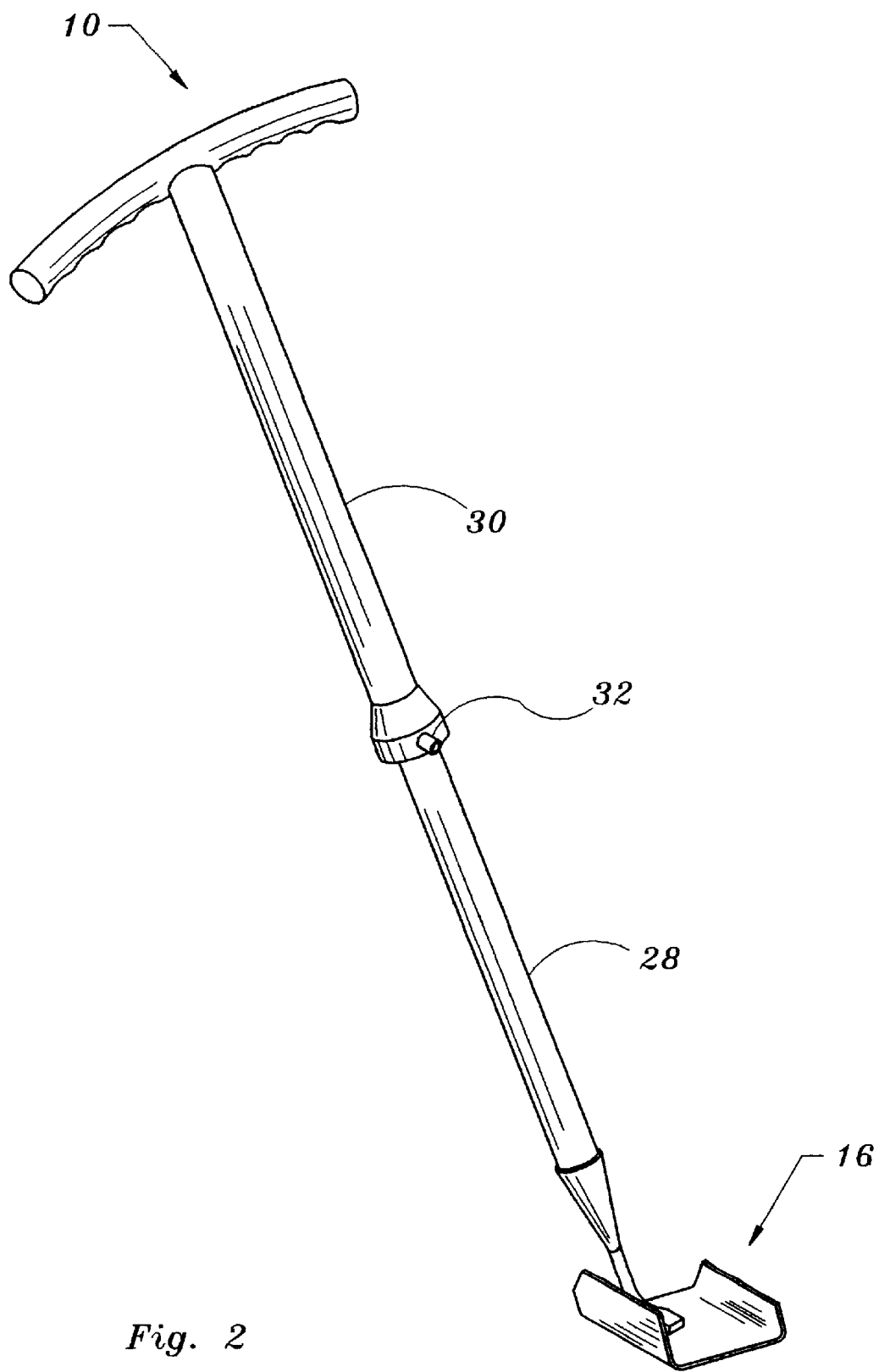
FIG. 2 is an isometric view of a garden tool produced in accordance with the preferred embodiment of the present invention.

A preferred embodiment of the invention is shown in FIG. 2. Here the handle 10 and the blade 16 are similar to that previously disclosed in FIG. 1, but the connection between the handle 10 and the blade 16 is modified to allow adjustment in the distance there between. This is accomplished by use of a shortened support member 28 which is capable of receiving the distal end of mounting member 30. The other end of the mounting member 30 is secured to the handle 10. The mounting member 30 also includes a locking means 32 to releasably secure the mounting member 30 and associated handle 10 at more than one position with respect to the shortened support member 28 and thereby to the associated blade 16. The resultant function is different positions between the handle 10 and the blade 16, thus providing height adjustments for various statures of individuals.

The locking means 32 can be comprised of a variety of simple or complex structures. It must be able to transmit torsional as well as longitudinal force from the mounting member 30 to the shortened support member 28. This is necessary because longitudinal and torsional forces are applied to the handle 10 by the user and must be transmitted to the blade 16 to properly function. For an item such as this, a simple device is usually preferred such as a pin that is inserted through a hole in the mounting member 30 and then through one of several corresponding holes in the shortened support member 28. Another suitable means includes a set screw received by a threaded portion in the mounting member 30. The shortened support member 28 is inserted into the mounting member 30 and the set screw is secured into the shortened support member 28, using friction to lock one to another.

The shortened support member could also include a groove, similar to a keyway, to receive the tip of the set screw, thus maintaining proper orientation of the blade 16 to the handle 10, but such a structure is not necessary to the function of the invention. Numerous other devices and combinations of devices could be used and are too numerous to describe or show here, but they would be considered obvious and are therefore innately associated with this description.

Figure 3:
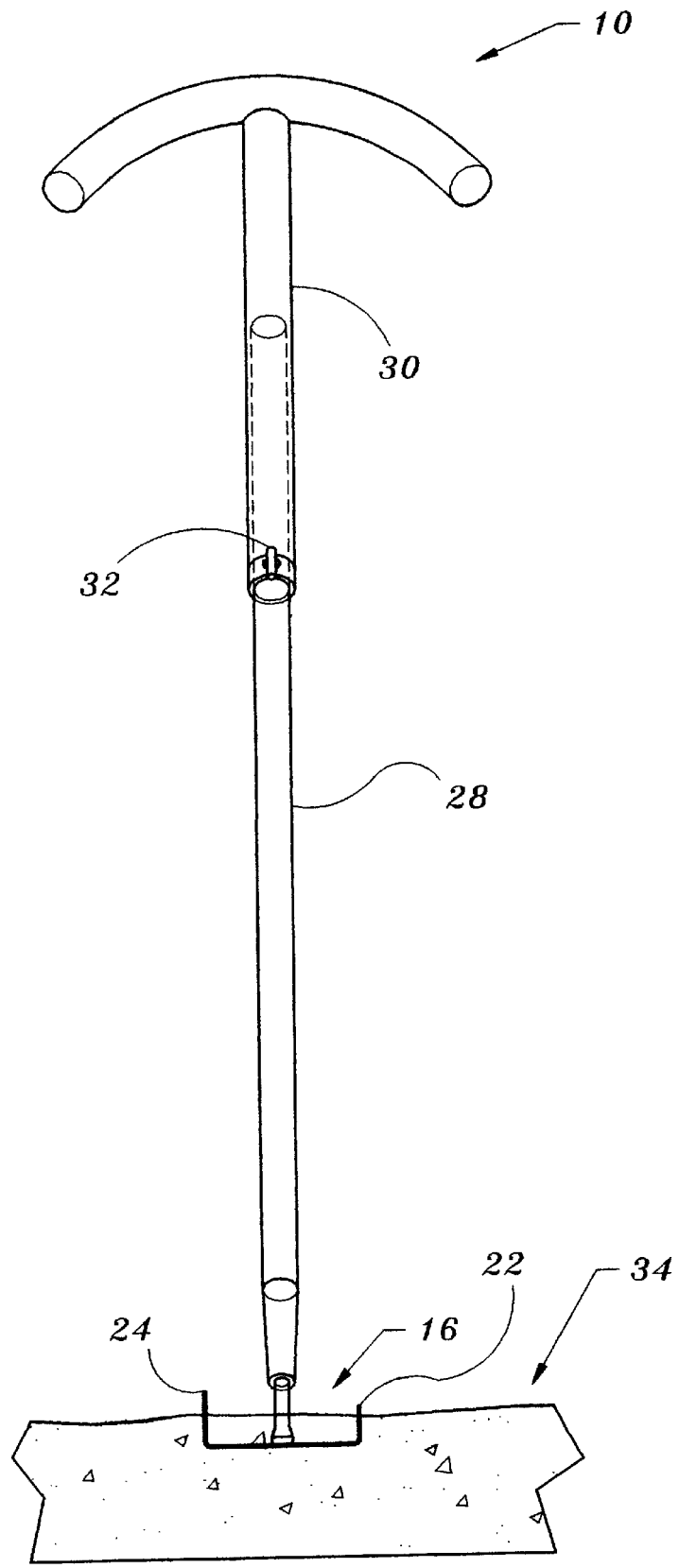
FIG. 3 is a front view of a garden tool produced in accordance with the preferred embodiment of the present invention.

FIG. 3 shows a front view of the device as shown in FIG. 2, the functional components being identical. Here is also seen the left fin 22 and the right fin 24 and that the latter extends above the former. This has been found to further facilitate the ease of motion through the soil 34, at least partially due to the right fin 24 is positioned behind the left fin 22. Therefore the right fin 24, or trailing fin, is more significant in the stabilization of the blade 16 as it cuts through the soil 34.

Figure 4:
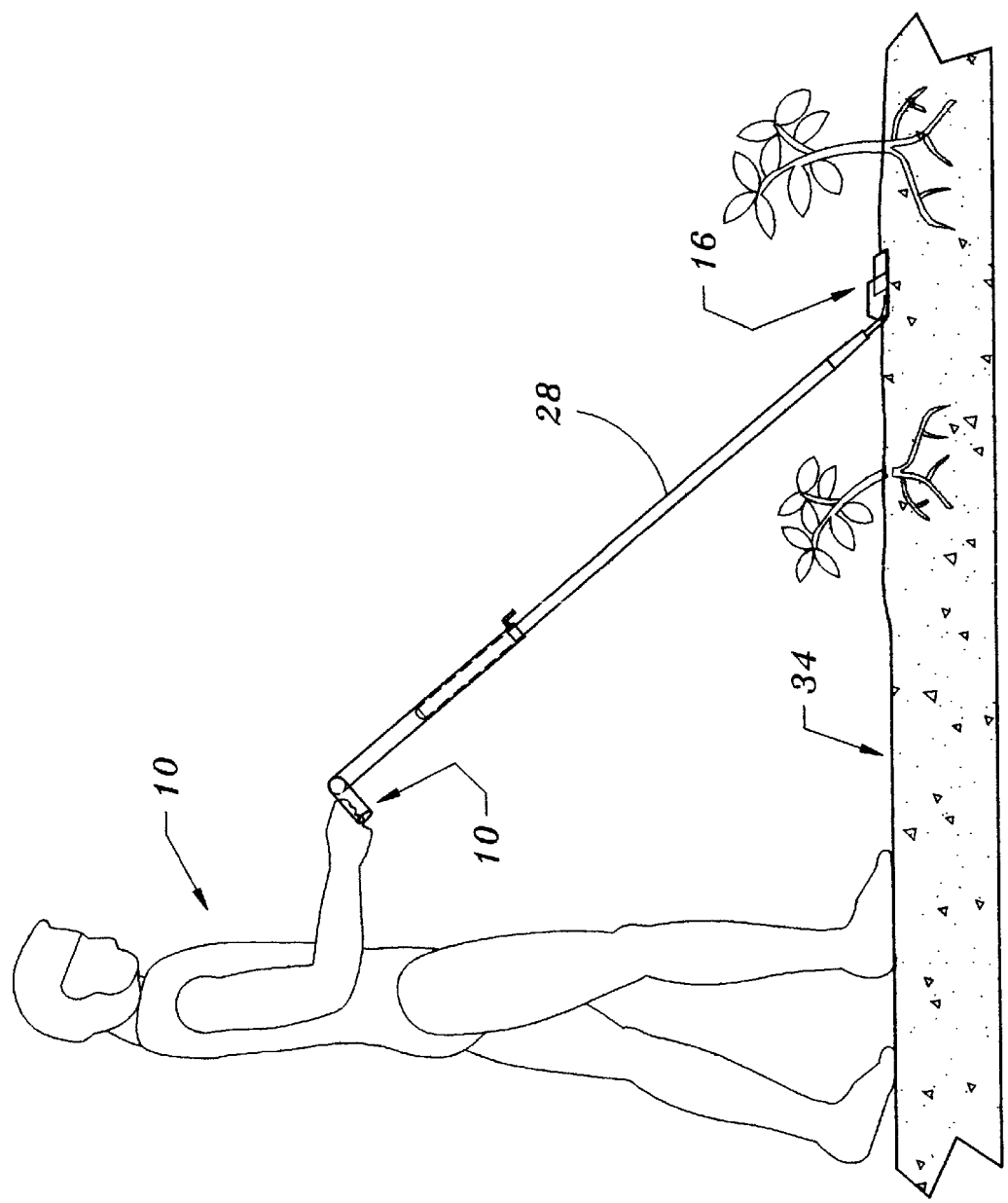
FIG. 4 is a side view of a garden tool produced in accordance with the preferred embodiment of the present invention.

The same version is shown in FIG. 4, only now from a side view. Here the user 36 is shown positioned behind the invention with his hands on the handle 10. The height of the handle 10 adjusted to be positioned near the lower portion of the user's 36 chest. This provides the user 36 with an opportunity to generate a great deal of force on the blade 16 to cut through the soil 34.

Figure 5:
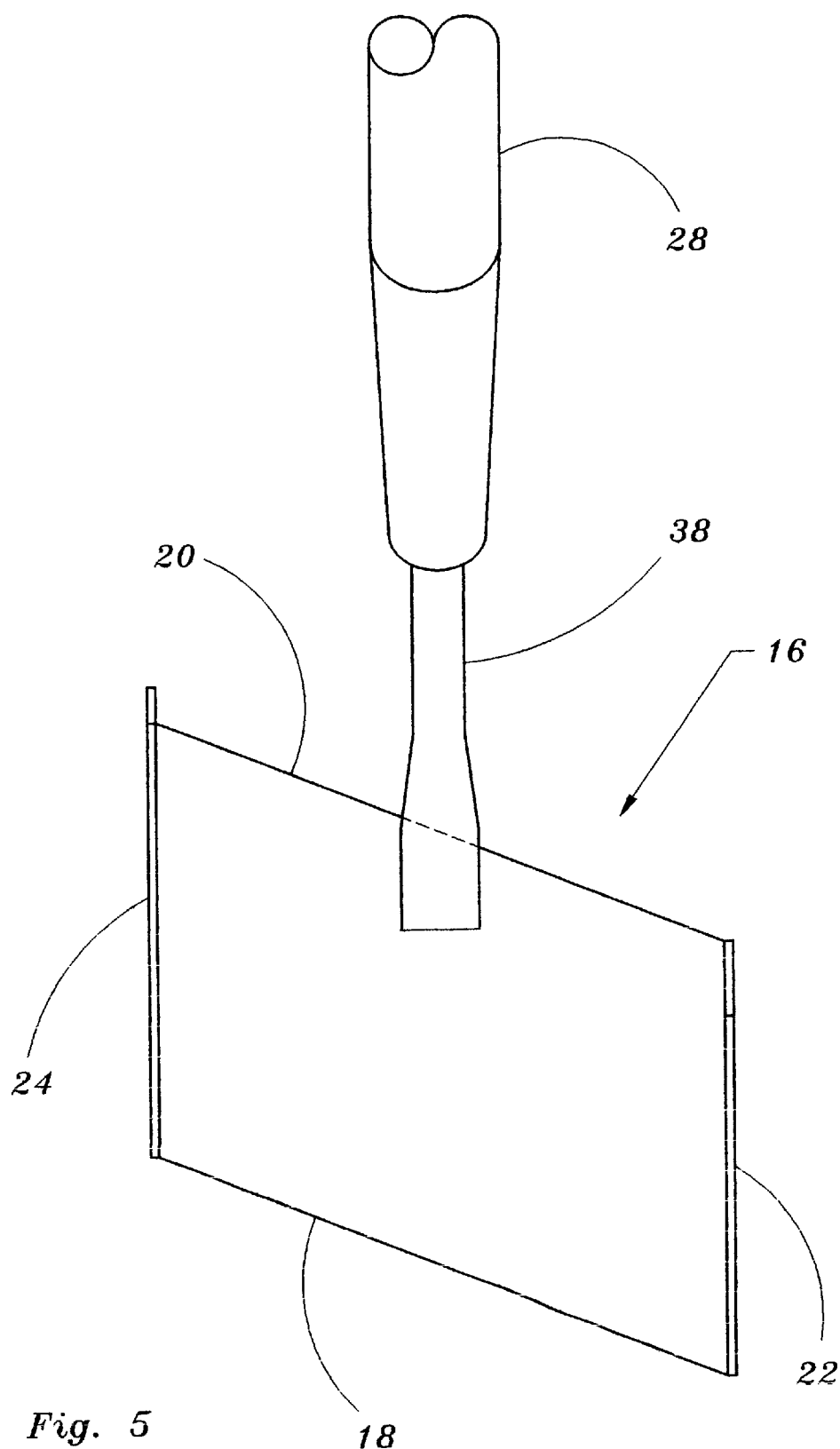
FIG. 5 is a top view of the blade portion of a garden tool produced in accordance with the preferred embodiment of the present invention.

FIG. 5 shows a top view of the blade 16 of the invention as would be seen opposite to the view of the user. The left fin 22 and the right fin 24 are shown along with the stein 38 which receives and is fastened to the shortened support member 28 and the stem 38 is attached to the blade 16. The stein 38 is of a narrow width to allow the soil to pass with minimal interference while the invention is being used. Also shown is the angle of the front edge 18 of the blade 16.

This portion of the invention 16 is most efficiently manufactured of steel with the stein 38 welded to the blade 16. The stem 38 provides a means of fastening the shortened support member 28 thereto, but the blade 16, or blade 16 and stem 38 combination could also be manufactured of aluminum, or even various thermoplastics or composite carbon fiber. In the case of plastic and carbon fiber, the blade 16 and stem 38 would more than likely be one piece that provides the capability of attachment to the shortened support member 28 (or support member 14 as shown in FIG. 1). In any case the blade 16 must be durable and capable of providing a front edge 18 that can maintain a sharp edge after repeatedly wearing against soil and plant roots.

Further shown in FIG. 5 it is easily seen in this, the preferred embodiment, that the left fin 22 is positioned in front of the right fin 24 as is necessitated by the angled front edge 18. The rear edge 20 is shown to be parallel to the front edge 18 but this is not necessary to the function of the invention, but is beneficial for manufacturing efficiency. The angled front edge 18 works with the fins (22 and 24) like a wedge to slice roots and rough spots in the soil, easing the use of the invention in accomplishing the task of removing unwanted plants from the soil. The angle of the front edge 18 is approximately between 20 to 30 degrees from perpendicular to the movement of the blade 16.

What is claimed is:

1. A garden tool comprising in combination:
    a blade, the blade comprising a blade base including a right edge and a left edge and a cutting edge, the cutting edge suitable for cutting through soil and plant roots;
    the blade further including a right fin being continuous with said right edge and a left fin being continuous with said left edge, the fins being positioned substantially orthogonal to said blade base and disposed in a parallel orientation one to another; and
    an elongated support member having a first end and a second end, the first end including a handle suitable for grasping by a user and the second end being capable of securing said blade thereto, whereby the user can grasp the handle of the combination thereby orienting the blade at the surface of the soil and push forward on the handle causing the blade to penetrate the surface of the soil, the forward movement slicing the roots of undesirable plants growing thereon while the fins maintain linear movement of the blade the combination allowing efficient function by the user, wherein said right fin is higher than the left fin.

2. A garden tool comprising in combination:
    a blade, the blade comprising a blade base including a right edge and a left edge and a cutting edge, the cutting edge suitable for cutting through soil and plant roots;
    the blade further including a right fin being continuous with said right edge and a left fin being continuous with said left edge, the fins being positioned substantially orthogonal to said blade base and disposed in a parallel orientation one to another; and
    an elongated support member having a first end and a second end, the first end including a handle suitable for grasping by a user and the second end being capable of securing said blade thereto, whereby the user can grasp the handle of the combination thereby orienting the blade at the surface of the soil and push forward on the handle causing the blade to penetrate the surface of the soil, the forward movement slicing the roots of undesirable plants growing thereon while the fins maintain linear movement of the blade the combination allowing efficient function by the user,
    wherein said right fin is higher than the left fin, and said right fin extends at least 38 mm above said base blade and the left blade extends at least 25 mm above the base blade.

3. A garden tool comprising in combination:
    a blade, the blade comprising a blade base including a right edge and a left edge and a cutting edge, the cutting edge suitable for cutting through soil and plant roots;
    the blade further including a right fin being continuous with said right edge and a left fin being continuous with said left edge, the fins being positioned substantially orthogonal to said blade base and disposed in a parallel orientation one to another;

a shortened support member having an upper end and a lower end, the lower end being capable of securing said blade thereto;

a handle suitable for grasping by a user, the handle also including a mounting member with a first end fixed to the handle and a second end being capable of receiving the upper end of said shortened support member; and a locking means capable of releasably securing the handle to said shortened support member at more than one position, thereby providing variation in the distance from the handle to the blade, thus allowing adjustability for users of varying stature, whereby the user can grasp the handle of the combination thereby orienting the blade at the surface of the soil and push forward on the handle causing the blade to penetrate the surface of the soil, the forward movement slicing the roots of undesirable plants growing thereon while the fins maintain linear movement of the blade the combination allowing efficient function by the use, wherein said right fin is higher than the left fin.

4. A garden tool comprising in combination:

a blade, the blade comprising a blade base including a right edge and a left edge and a cutting edge, the cutting edge suitable for cutting through soil and plant roots;

the blade further including a right fin being continuous with said right edge and a left fin being continuous with said left edge, the fins being positioned substantially orthogonal to said blade base and disposed in a parallel orientation one to another;

a shortened support member having an upper end and a lower end, the lower end being capable of securing said blade thereto;

a handle suitable for grasping by a user, the handle also including a mounting member with a first end fixed to the handle and a second end being capable of receiving the upper end of said shortened support member; and a locking means capable of releasably securing the handle to said shortened support member at more than one position, thereby providing variation in the distance from the handle to the blade, thus allowing adjustability for users of varying stature, whereby the user can grasp the handle of the combination thereby orienting the blade at the surface of the soil and push forward on the handle causing the blade to penetrate the surface of the soil, the forward movement slicing the roots of undesirable plants growing thereon while the fins maintain linear movement of the blade the combination allowing efficient function by the use, wherein said right fin is higher than the left fin, and said right fin extends at least 38 mm above said base blade extends at least 25 mm above the base blade.

\* \* \* \* \*